(12) United States Patent
Wang et al.

(10) Patent No.: US 9,900,424 B2
(45) Date of Patent: Feb. 20, 2018

(54) CHIP AWARE THERMAL POLICY

(71) Applicant: MEDIATEK INC., Hsinchu (TW)

(72) Inventors: Wei-Ting Wang, Taipei (TW);
Han-Lin Li, Taoyuan (TW); Hong-Jie Huang, Tainan (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/097,429

(22) Filed: Apr. 13, 2016

(65) Prior Publication Data
US 2017/0302782 A1    Oct. 19, 2017

(51) Int. Cl.
*G08B 17/00*   (2006.01)
*H04M 1/725*   (2006.01)

(52) U.S. Cl.
CPC .............. *H04M 1/72569* (2013.01)

(58) Field of Classification Search
None
See application file for complete search history.

(56) References Cited

U.S. PATENT DOCUMENTS

| | | | |
|---|---|---|---|
| 2007/0045825 A1 | 3/2007 | Chan et al. | 257/723 |
| 2012/0259446 A1* | 10/2012 | McConaghy | G06F 17/5022 700/104 |
| 2012/0324248 A1* | 12/2012 | Schluessler | G06F 1/3253 713/300 |
| 2013/0046999 A1 | 2/2013 | Jung | 713/300 |
| 2016/0048363 A1* | 2/2016 | North | G06F 1/1616 345/1.1 |

FOREIGN PATENT DOCUMENTS

EP   2560073 A1   2/2013

OTHER PUBLICATIONS

Process Corners, Wikipedia, the free encyclopedia, retrieved on Apr. 11, 2016 (3 pages).
Product Binning, Wikipedia, the free encyclopedia, retrieved on Apr. 11, 2016 (2 pages).
EPO, Search Report for the EP patent application 16171162.7 dated May 9, 2017 (9 pages).

* cited by examiner

*Primary Examiner* — Adolf Dsouza
(74) *Attorney, Agent, or Firm* — Imperium Patent Works; Helen Mao

(57) ABSTRACT

Methods and apparatus are provided for chip aware thermal policies. The thermal performance mapping information is generated. The process obtains a set of process-dependent power data for each process corner of a semiconductor chip, profiles performance data, and selects an operating thermal policy based on the performance data. The thermal policy, based on the process-dependent power data is a mapping formula, or a combination of a mapping formula and a mapping table. The chip aware thermal control is based on process-dependent power data of process corners. The mapping information of process-dependent power data to a corresponding thermal policy is stored in a memory. A thermal policy is applied based on the stored mapping information and an obtained process corner information. The mapping information is applied every time the thermal policy is needed or at boot-up time.

19 Claims, 5 Drawing Sheets

CHIP AWARE THERMAL POLICY

TECHNICAL FIELD

The disclosed embodiments relate generally to power/resource budget method, and, more particularly, to chip aware thermal policies.

BACKGROUND

With the rapid growth in mobile/wireless and other electronics devices, the battery life becomes an important factor in the success of such devices. At the same time, many advanced applications for these devices are becoming more and more popular. Such applications normally require high performance of components in the devices. Sustainable power is limited by the dissipation capability and thermal constraint. The device or semiconductor chips can malfunction if the temperature is too high. Thermal throttle methods are commonly used in the devices to prevent overheat problems due to the dissipation limitation. One of the issue for thermal throttling is efficiency. The traditional thermal throttling uses generic parameters in controlling the temperature. The parameters, such as the maximum allowable temperature and the threshold temperature do not consider the characteristic of each individual chip. For example, different power leakage results in different thermal-power performance. In semiconductor manufacturing, a process corner is an example of a technique that refers to a variation of fabrication parameters used in applying an IC design to a semiconductor wafer. Process corners represent the extremes of these parameter variations within which a circuit that has been etched onto the wafer must function correctly. A circuit running on devices fabricated at these process corners may run slower or faster than specified and may run at lower or higher temperatures and voltages. While using the same set of thermal-power parameters, the thermal-power performance becomes inconsistent. In some scenarios, the thermal-power control cannot effectively control the temperature within the required range. In other scenarios, the performance of the system is unnecessarily sacrificed.

Under the current one temperature setting policy, the thermal-power performance is not optimized. It suffers potential target temperature margin on the chip, which results in potential performance sacrifices. Thermal-related settings are proposed to enhance the thermal policy.

Improvements and enhancements are needed for chip-aware thermal policy.

SUMMARY

Methods and apparatus are provided for chip aware thermal policies. In one novel aspect, the thermal performance mapping information is generated for chip aware thermal control. In one embodiment, the process obtains a set of process-dependent power data for each process corner of a semiconductor chip. The process profiles performance data based on the set of process-dependent power data, the maximum temperature value, and different thermal policies. Subsequently, the process selects an operating thermal policy based on the performance data such that a thermal-performance score meets a predefined criteria. In one embodiment, the thermal policy is a mapping formula based on the process-dependent power data. The input parameters of the mapping formula are process-dependent power data for each process corner. The output of the mapping formula includes at least one parameter selecting from the group comprising thermal settings, and power to thermal relationships. In another embodiment, the thermal policy is a mapping table based on the process-dependent power data. In yet another embodiment, the thermal policy includes a mapping formula and a mapping table. In one embodiment, the profiling the performance number involves running all configurations for each process corner using different thermal policies, filtering out performance data that does not meet a predefined thermal requirement, and selecting a configuration based on the performance data, wherein the selected configuration corresponds to an entry in the policy.

In another novel aspect, chip aware thermal control based on process-dependent power data of process corners is provided. In one embodiment, the process stores mapping information of process-dependent power data to a corresponding thermal policy in memory. The process further obtains process-dependent power data of the chip based on process corner information of the chip. A thermal policy is applied based on the stored mapping information and the obtained process corner information. In one embodiment, the mapping information is a mapping table contains thermal policies corresponding with pairs of a process corner and a leakage. In one embodiment, the mapping information is applied at boot time. In another embodiment, the mapping information is applied every time a thermal policy is needed. In one embodiment, the thermal policy comprises a plurality of trip temperature thresholds and corresponding thermal cooler configuration. In one embodiment, the thermal cooler configuration is based on the DVFS method. In another embodiment, the thermal cooler configuration is based on the CPU hot-plug method.

Further details, embodiments, and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
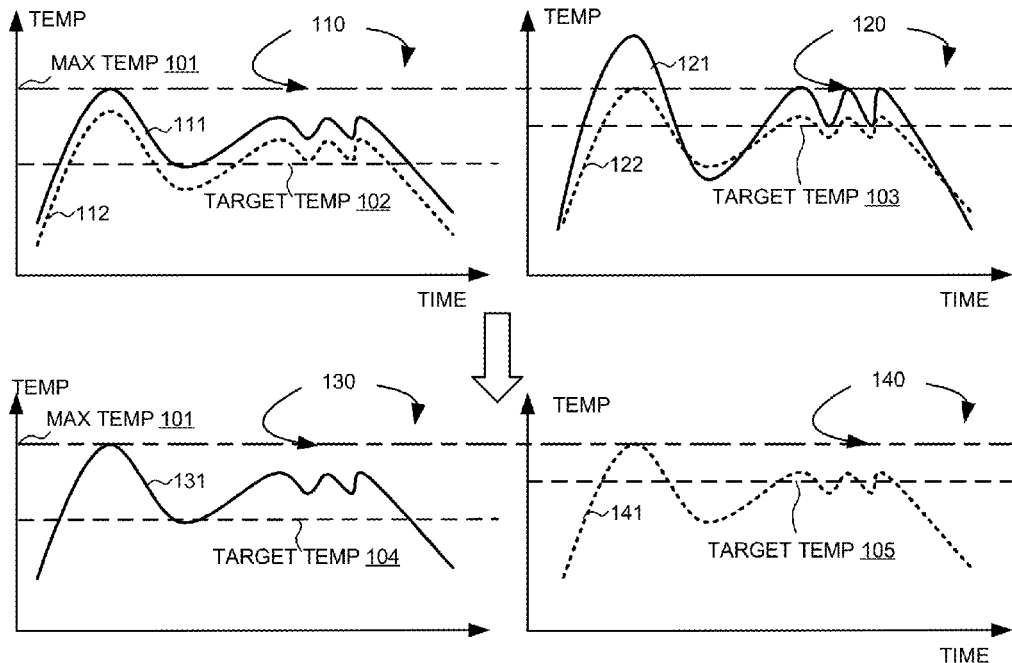
FIG. 1 shows exemplary diagrams of thermal-performance for different process corners under different thermal policies in accordance with embodiments of the current invention.

FIG. 1 shows exemplary diagrams of thermal-performance for different process corners under different thermal policies in accordance with embodiments of the current invention. There exist variations in terms of thermal performance for each chip. One of the factor to affect the thermal performance is the process corners. Process corners represent variations that occur in wafer production. The process corners have different thermal and performance behaviors. The industry has uses two-letter designation to describe different corner, where the first letter refers to the NMOS and the second letter refers to the PMOS. The process corners include: FF (fast fast), SF (slow fast), SS (slow slow), FS (fast slow), and TT (typical typical). The first three corners (TT, FF, SS) are called even corners, because both types of devices are affected evenly, and generally do not adversely affect the logical correctness of the circuit. The resulting devices can function at slower or faster clock frequencies. The last two corners (FS, SF) are called "skewed" corners, and are cause for concern. This is because one type of FET will switch much faster than the other, and this form of imbalanced switching can cause one edge of the output to have much less slew than the other edge. Different process corners consume power differently. With smaller power consumption, the system may be set to higher target temperature setting to avoid the system from exceeding a threshold temperature at next moment since the temperature changes are small. Similarly, with higher power consumption, the system may be set to lower target temperature setting to avoid the system from exceeding the threshold temperature at next moment since the temperature changes are large.

FIG. 1 shows different scenarios. Plot 110 is an exemplary chart of the temperature variation using the thermal control. The system has a maximum allowable temperature 101. For example, maximum allowable temperature 101 is set to be 100° C. In order to control the temperature to be under the maximum allowable temperature 101, a target temperature 102 is set. In one embodiment, the thermal control triggers temperature lowering procedure upon detecting the temperature goes above target temperature 102. Plot 110 shows one scenario where the value of the target temperature is set according to the FF corner. For example, target temperature 102 is set to be 80° C. Curve 111 is the temperature to time graph for an FF corner chip based on target temperature 102. Curve 112 is the temperature to time graph for an SS corner chip based on target temperature 102. As shown, because both FF corner chip and the SS corner chip use the same target temperature, the SS corner chip suffers target temperature margin. Curve 112 stays below maximum allowable temperature 101 with a gap. The SS corner chip operates at a lower power unnecessarily and suffers performance degradation unnecessarily.

In contrast, plot 120 is an exemplary chart of the temperature variation using the thermal control when the target temperature 103 is set based on SS corner performance. The system has a maximum allowable temperature 101. For example, maximum allowable temperature 101 is set to be 100° C., and target temperature 103 is set to be 85° C. Curve 121 is the temperature to time graph for an FF corner chip based on target temperature 103. Curve 122 is the temperature to time graph for an SS corner chip based on target temperature 103. As shown, because both FF corner chip and the SS corner chip use the same target temperature, the temperature of the FF corner chip goes to over the maximum allowable temperature and may trigger thermal protection procedure, such as system reboot.

In one novel aspect, different target temperatures are configured based on the processor corner of the chip. As shown in plot 130, curve 131 is the temperature to time graph for an FF corner chip based on target temperature 104, which is set based on FF corner chips. Using the target temperature specifically for the FF corner, the temperature stays below the maximum allowable temperature while no target temperature margin occurs. Similarly, as shown in plot 140, curve 141 is the temperature to time graph for an SS corner chip based on target temperature 105, which is set based on SS corner chips. Using the target temperature specifically for the SS corner, the temperature stays below the maximum allowable temperature while no target temperature margin occurs.

As shown, by using different target temperature for different process corner, the power efficiency increases and avoids temperature being over the maximum allowable temperature.

Figure 2:
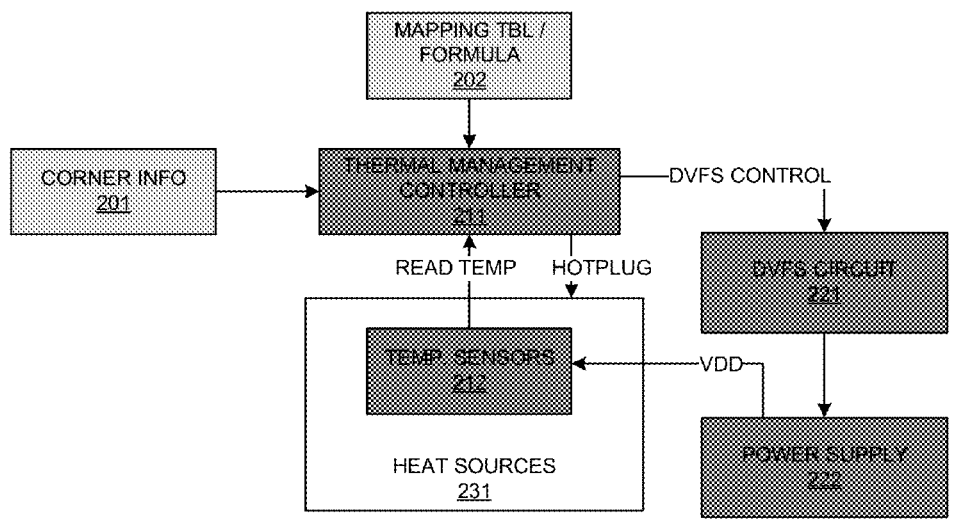
FIG. 2 shows an exemplary diagram for the thermal control based on processor corner information in accordance with embodiments of the current invention.

FIG. 2 shows an exemplary diagram for the thermal control based on processor corner information in accordance with embodiments of the current invention. A thermal management controller 211 monitors temperatures and controls powers to keep the temperature to be under a predefined threshold. In one embodiment, the temperature control uses Dynamic Voltage and Frequency Scaling (DVFS). The DVFS strategy is a low-power strategy to leverage performance and power by dynamically adjusting clock frequency and voltage. One of the main issues for the low-power policy of DVFS is to balance two competing objectives, which are maximizing the power saving and ensuring tight fine-grain performance. Thermal management controller 211 sets DVFS frequency under power limit based on its input parameters. Thermal management controller 211 sends the DVFS control to a DVFS circuit 221. DVFS circuit 221 controls a power supply 222 based on the DVFS control received from thermal management controller 211. In one embodiment, power supply 222 may include one or more power supply sources. In one embodiment, each of the power supply sources may receive different control based on the configuration.

Another method of power control is Hot-plug. The hot-plug strategy is a low-power strategy to leverage performance and power by employing one or more CPU cores. One of the main issues for low-power policy of the CPU hot-plug is when to turn on or turn off the one or more CPU cores. In general, with more CPU cores turned on, more power consumption. The low-power policy needs to consider the performance and power overhead when turning on and off the CPU cores. Differ process corner with different power leakage performs differently under the thermal threshold setting. In one embodiment, thermal management controller 211 sends hot-plug control information to heat sources 231. In one embodiment, heat sources 231 include one or more heat sources that each may generate different thermal effect. The hot-plug control information may include different instruction based on the configuration and the different type of the heat sources.

In one novel aspect, thermal management controller 211 sets controls for DVFS and/or hot-plug thermal controls based on process corner information. Thermal management controller 211 monitors one or more heat sources, such the CPU, the GPU. Thermal management controller 211 receives temperature updates from the temperature sensors 212. Process-corner information handler 201 obtains process corner information of the chip and forwards it to thermal management controller 211. The process-corner information can be preconfigured or obtained by detection. Thermal management controller 211, based on the process corner information retrieves a process-dependent thermal policy formula. In one embodiment, the thermal policy formula is stored in a database. Thermal management controller 211 obtains thermal-policy related settings based on the thermal formula. In another embodiment, thermal management controller 211, based on the process corner information retrieves a thermal policy table stored in the memory. Thermal management controller 211 obtains thermal-policy related settings by looking up the thermal table. In yet another embodiment, management controller 211, based on the process corner information retrieves both a thermal policy and a thermal policy table. In one embodiment, the thermal policy formula and/or the thermal policy table is retrieved at boot time. In another embodiment, the thermal policy formula and/or the thermal policy table is retrieved every time the thermal policy is referred. Thermal management controller determines operation control information for thermal throttling based on the inputs from process-corner information handler 201, mapping table/formula handler 202, and temperature sensors 212.

Figure 3:
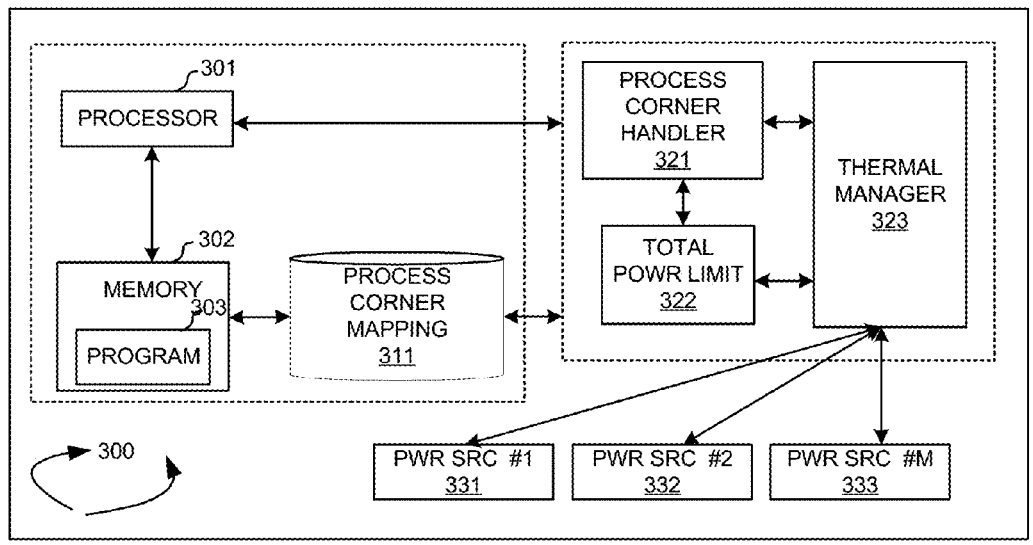
FIG. 3 shows simplified block diagrams of a device 300 that performs chip aware power control in accordance with embodiments of the current invention.

FIG. 3 shows simplified block diagrams of a device 300 that performs chip aware power control in accordance with embodiments of the current invention. Device 300 has a processor 301. Processor 301 processes the received signals and invokes different functional modules to perform features in device 300. Memory 302 stores program instructions 303 and data to control the operations of device 300. One or more databases are stored in memory 302. In novel aspect, a process corner mapping 311 is stored as one database entry. Process corner mapping 311 can be stored in memory 302, retrieved from a hard disk or external database. Device 300 includes one or more power sources, such as a power source #1 331, a power source #2 332, and a power source #M 333. In one embodiment, each power source is controlled by corresponding power limit setting. The power setting of each power source is adjusted based on its corresponding power limit.

In one embodiment, process corner mapping 311 may reside in memory 302, or in a hard disk inside device 300. Further, process corner mapping 311 may also reside in other forms of memory external to device 300. In one embodiment, other predefined or preconfigured thermal setting may also be stored. The thermal setting may include the target temperature for each corresponding process corner, and the maximum allowable temperature.

Device 300 also includes a set of control modules, such as a process corner handler 321, a total power limit unit 322, and a thermal manager 323. In one novel aspect, process corner handler 321 obtains process-dependent power data of the chip based on process corner information of the chip. Different process corner has different leakage power. The leakage power grows with temperature settings. As a result, higher temperature setting does not always lead to higher performance. Optimization is needed to adjust the temperature setting to achieve higher performance. For example, process corners with higher leakage should adjust the temperature setting to lower level. A thermal-power performance score varies by the temperature of the operation and the power-to-thermal relationship value, ranging from one to fifty. The higher the thermal-power performance score, the more efficient the system is. Process corner handler 321 first retrieve process corner information of the chip. Based on the information, process corner handler 321 obtains process-dependent power data from process corner mapping 311.

Total power limit unit 322 obtains information from process corner handler 321 and sets a total power limit for the chip. The total power limit is sent to thermal manager 323. Thermal manager 323 applies a thermal policy based on the stored mapping information and the obtained process corner information. Upon receiving updates of the total power limit, thermal manager 323 sets individual power limit for each power source.

To maintain the temperature of the device below a target temperature, the power setting of the heat source needs to be adjusted. When the power setting is adjusted to a lower level, the performance is reduced. Therefore, dynamic algorithms are needed to maximize the performance while maintaining the temperature to be within the limit. In a traditional way, a power limit is used to reduce the power setting once the temperature is over a target temperature. Such method unnecessarily sacrifices performance if the configuration adjusting the power more aggressively, otherwise, if the power adjustment is too slow, such method may not be effective enough to lower the temperature fast enough resulting in the temperature rising over the target temperature. In one novel aspect, the target temperature is set to different values based on the process corner information.

Figure 4:
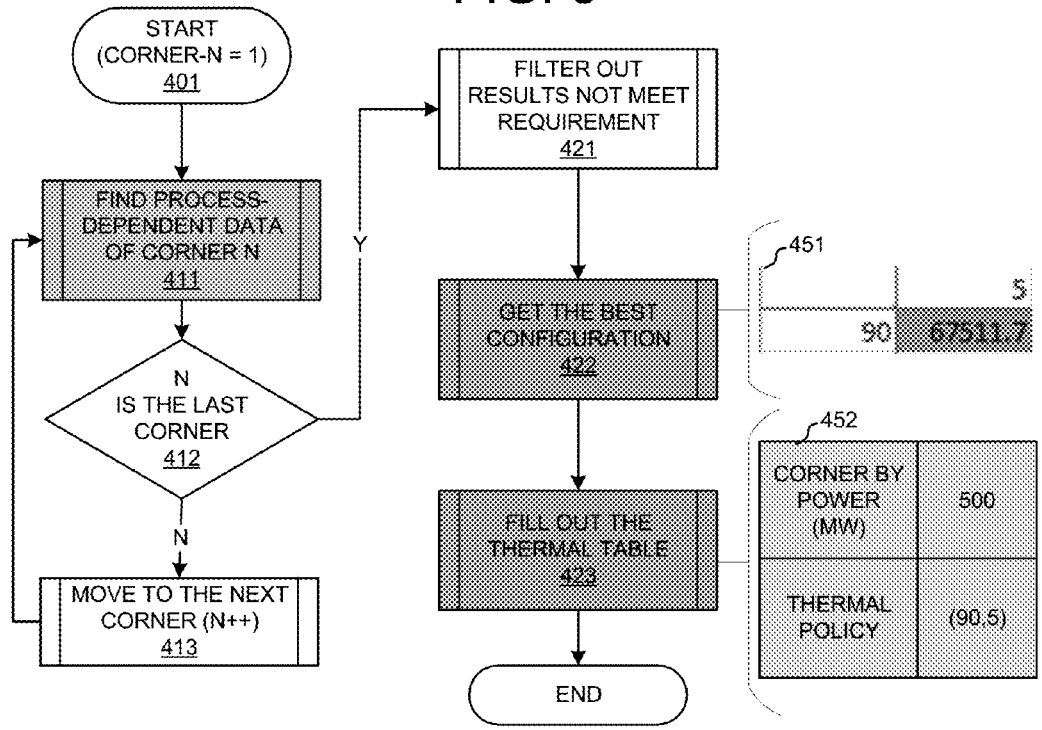
FIG. 4 shows an exemplary flow chart for the chip aware thermal control based on process-dependent power data of process corners in accordance with embodiments of the current invention.

FIG. 4 shows an exemplary flow chart for the chip aware thermal control based on process-dependent power data of process corners in accordance with embodiments of the current invention. At step 401, the process starts with the first process corner. At step 411, the process finds process-dependent power data for the first process corner. In one embodiment, the process-dependent power data is the thermal-power performance score table with the temperature and the power-to-thermal relationship value. The table is generated using a predefined leakage power. Each entry of the table is a thermal-power performance score with the particular temperature and the power-to-thermal relationship value. The higher the thermal-power score, the better the performance. At step 412, the process checks whether this is last process corner. If step 412 determines no, the process moves to step 413. At step 413, the process moves on to the next process corner and goes back to step 411 to find process-dependent power data for the next process corner. If step 412 determines yes, the process moves to step 421. At step 421, the process filters out the results in the thermal-performance score table that do not meet predefined requirements. In one embodiment, the predefined requirement is that the temperature to be below a predefined temperature, such as the maximum allowable temperature. A sub-set of the thermal-performance score table is generated after step 421. At step 422, the process gets the best configuration from the filtered table. Entry 451 shows an exemplary configuration that is selected from the table as the best configuration. In one embodiment, the entry is selected based on predefined criteria for the thermal-performance score. In one embodiment, the best thermal-performance score is selected. The best thermal-performance score in the filtered table is 67511.7 with the temperature at 90° C. and the power-to-thermal relationship value is at five. The best (temperature, power-to-thermal relationship value) is (90, 5). At step 423, the process fills out the thermal table with the best configuration. For example, entry 452 is an exemplary entry of the thermal table. The processor corner is measured with a leakage power of 500 mw. The best thermal policy in terms of (temperature, power-to-thermal relationship value) is (90, 5). The process produces a best policy table for all possible process corners. The table is used by the thermal manager to choose the best policy based on other thermal related information.

Figure 5:
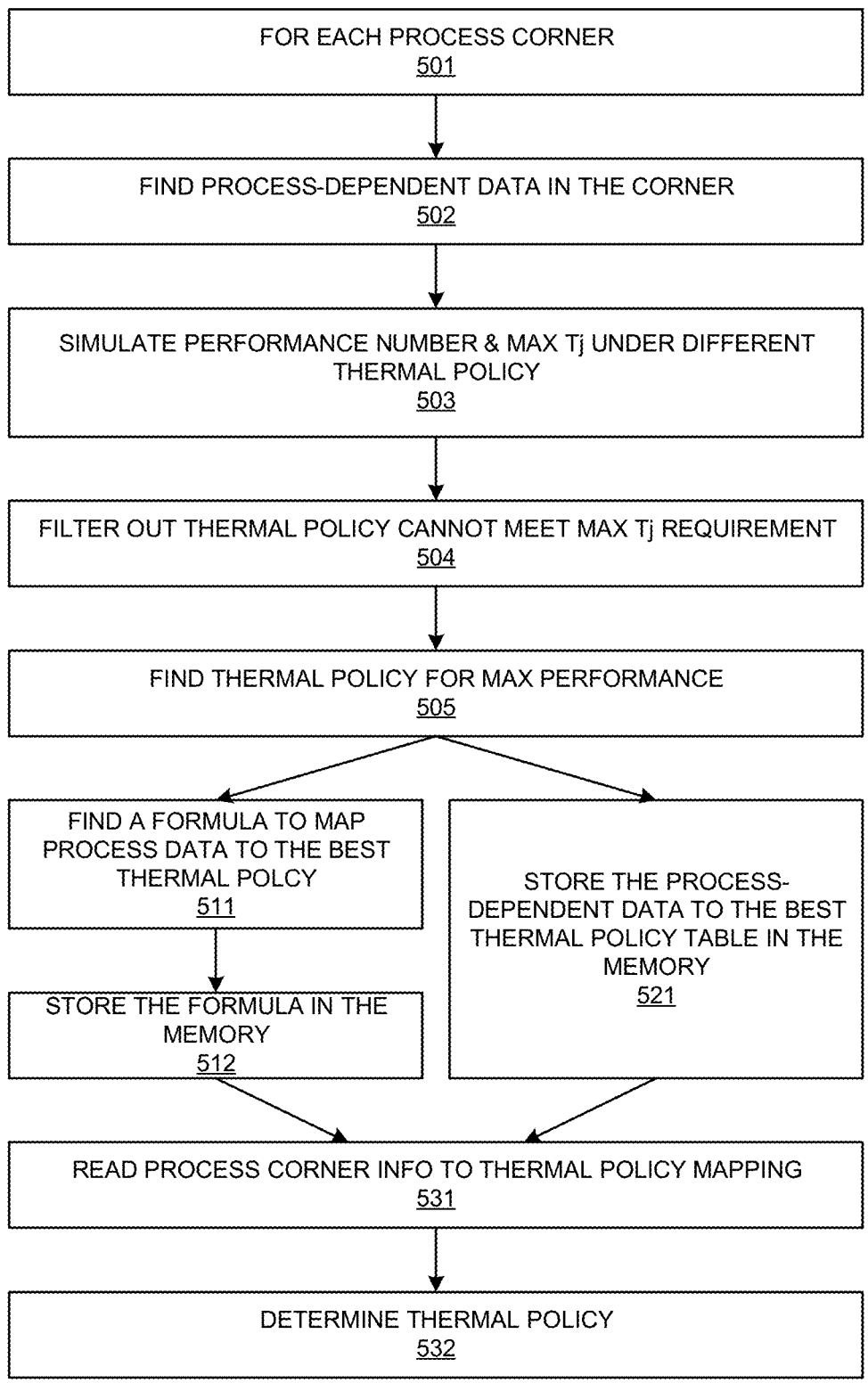
FIG. 5 shows an exemplary flow chart of loading the process corner information to thermal policy mapping in accordance with embodiments of the current invention.

FIG. 5 shows an exemplary flow chart of loading the process corner information to thermal policy mapping in accordance with embodiments of the current invention. At step 501, the process goes through each process corner. At step 502, the process finds process-dependent power data in the corresponding process corner. A predefined leakage power is used in generating the process-dependent power data. At step 503, the process simulates performance number and the maximum Tj under different thermal policies, where the Tj is the maximum temperature in the period of execution. In one embodiment, the simulation model is modified to run multiple configurations with one input file. The configuration file specifies different time steps, the temperature setting range, and the temperature related setting range. In another embodiment, the simulation time is reduced by reducing the output size. The output size can be reduced by using summary result instead of using raw data.

At step 504, the process filters out the thermal policies that cannot meet the maximum Tj requirement. At step 505, the process finds the thermal policy that produces the maximum performance. Once the simulation is done, the best performance data can be obtained from the results. In one embodiment, the best performance data uses a formula to map process data to the best thermal policy. In another embodiment, the process-dependent power data to the best thermal policy table is used.

In one embodiment, a formula Y=f(X) is used for thermal policy retrieval. The thermal formula input X includes at least one input items comprising: process-dependent power data for different process corner information, such as typical, fast, and slow corner, and general power data by test patterns. The thermal formula output Y includes at least one output-items comprises: the thermal settings, and the power to thermal relationship value. The thermal settings include the target temperature, the trip temperature, or the temperatures to apply to different thermal management policies. The power to thermal relationship value includes a ratio, a lookup table, or a formula to represent the contribution of the power to the thermal. At step 511, the process finds the formula as described above and maps the process-dependent power data to the best thermal policy At step 512, the process stores the formula in the memory. In another embodiment, the process stores the process-dependent power data to the best thermal policy table in the memory. The best thermal policy table lists the best thermal configuration for different process corners. After storing the thermal policy formula or the thermal policy table in the memory, the process moves to step 531. At step 531, the process reads the process corner information. In one embodiment, the information is read at the boot-up time and stored in the memory. In another embodiment, the information is loaded at runtime whenever it is needed. At step 532, the process determines the thermal policy based on the process corner information and the stored best thermal policy table or formula.

Figure 6:
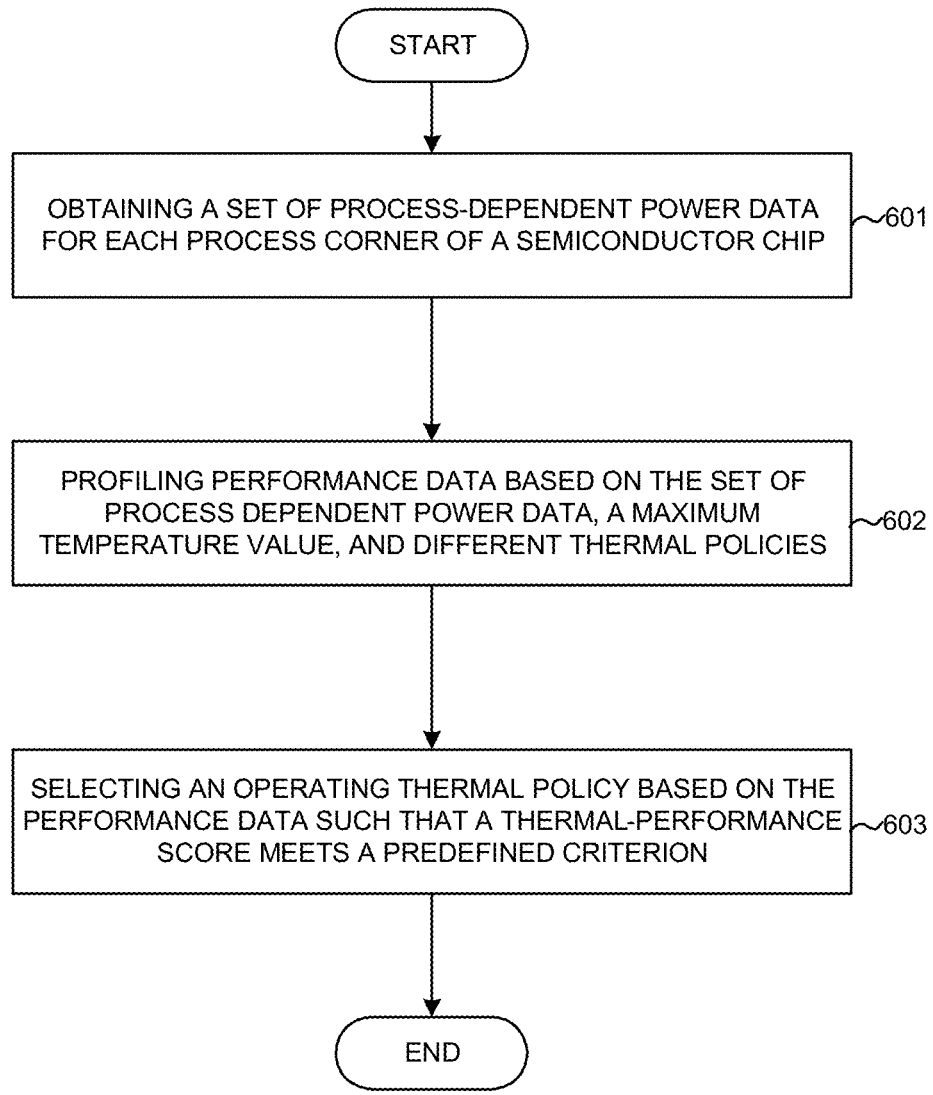
FIG. 6 shows an exemplary flow chart of obtaining thermal policies for different process corners in accordance with embodiments of the current invention.

FIG. 6 shows an exemplary flow chart of obtaining thermal policies for different process corners in accordance with embodiments of the current invention. At step 601, the apparatus obtains a set of process-dependent power data for each process corner of a semiconductor chip. At step 602, the apparatus profiles performance data based on the set of process dependent power data, a maximum temperature value, and different thermal policies. At step 603, the apparatus selects an operating thermal policy based on the performance data such that a thermal-performance score meets predefined criterion.

Figure 7:
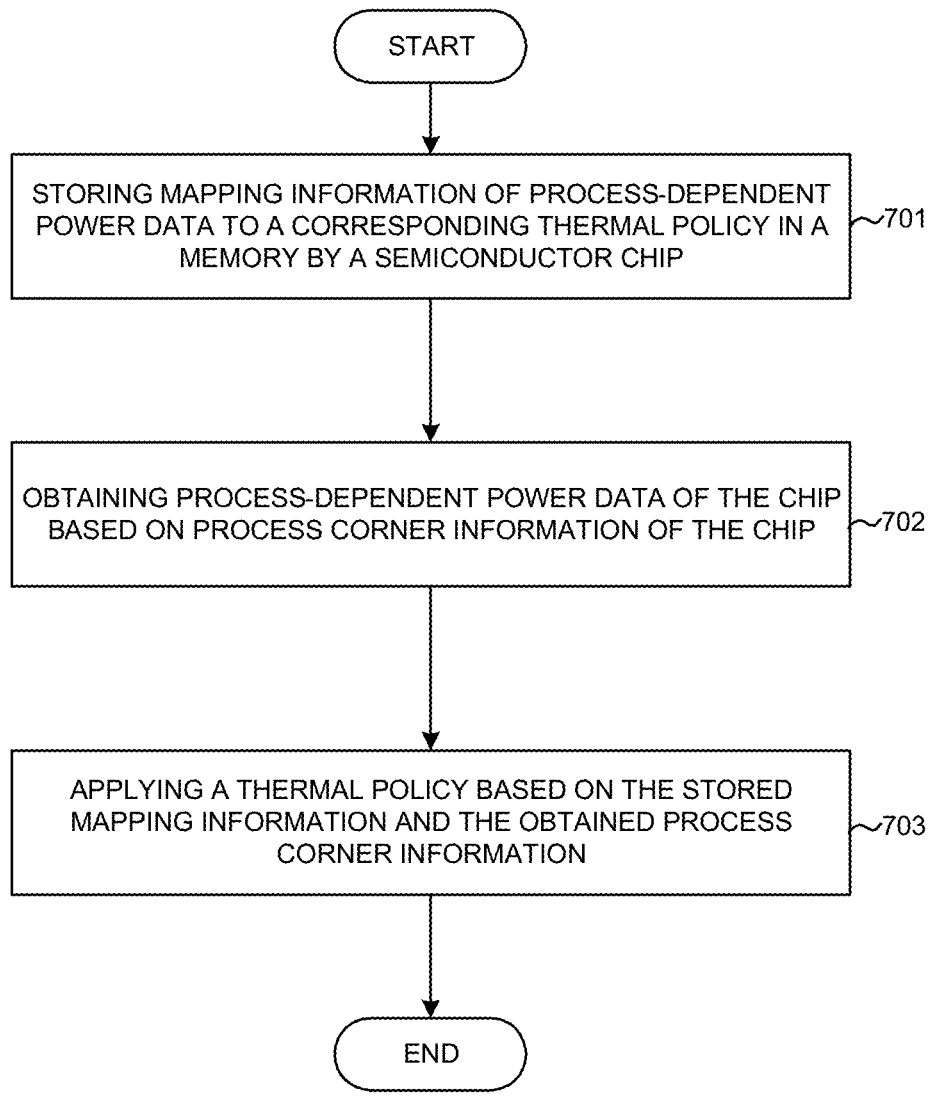
FIG. 7 shows an exemplary flow chart of chip aware thermal control based on process corner information in accordance with embodiments of the current invention.

FIG. 7 shows an exemplary flow chart of chip aware thermal control based on process corner information in accordance with embodiments of the current invention. At step 701, the apparatus stores in a memory the mapping information of process-dependent power data vs a corresponding thermal policy. At step 702, the apparatus obtains process-dependent power data of the chip based on process corner information of the apparatus. At step 703, the apparatus applies a thermal policy based on the stored mapping information and the obtained process corner information.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
obtaining a set of process-dependent power data for each process corner of a semiconductor chip;
profiling performance data based on the set of process dependent power data, a maximum temperature value, and different thermal policies; and
selecting an operating thermal policy based on the performance data such that a thermal-performance score meets a predefined criterion, wherein the thermal policy is a mapping table based on the process-dependent power data, and wherein the mapping table contains thermal policies corresponding with pairs of a process corner and a leakage.

2. The method of claim 1, wherein the thermal policy further comprises a mapping formula.

3. The method of claim 1, wherein the profiling performance number involves:
running all configurations for each process corner using different thermal policies;
filtering out performance data that does not meet a predefined thermal requirement; and
selecting a configuration based on the performance data, wherein the selected configuration corresponds to an entry in the policy.

4. A method, comprising:
storing mapping information of process-dependent power data to a corresponding thermal policy in a memory by a semiconductor chip;
obtaining process-dependent power data of the chip based on process corner information of the chip; and
applying a thermal policy based on the stored mapping information and the obtained process corner information, wherein the thermal policy comprises a plurality of trip temperature thresholds and corresponding thermal cooler configuration, wherein the thermal cooler configuration is applied when a detected temperature is higher than a trip temperature threshold.

5. The method of claim 4, wherein the mapping information is a mapping table contains thermal policies corresponding with pairs of a process corner and a leakage.

6. The method of claim 4, wherein the mapping information a mapping formula based on the process-dependent power data.

7. The method of claim 4, wherein the mapping information is applied at boot time.

8. The method of claim 4, wherein the mapping information is applied every time a thermal policy is needed.

9. The method of claim 4, wherein the thermal cooler configuration comprises at least one thermal actions comprising setting a frequency limit, and setting a CPU core limit.

10. The method of claim 4, wherein the thermal policy controls a power budget based a target temperature.

11. An apparatus, comprising:
a memory that stores mapping information of process-dependent power data to a corresponding thermal policy;
a process corner handler that obtains process-dependent power data of the chip based on process corner information of the chip; and
a thermal manager that applies a thermal policy based on the stored mapping information and the obtained process corner information, wherein the thermal policy comprises a plurality of trip temperature thresholds and corresponding thermal cooler configuration, wherein the thermal cooler configuration is applied when a detected temperature is higher than a trip temperature threshold.

12. The apparatus of claim 11, wherein the mapping information is a mapping table contains thermal policies corresponding with pairs of a process corner and a leakage.

13. The apparatus of claim 11, wherein the mapping information is a mapping formula based on the process-dependent power data.

14. The apparatus of claim 11, wherein the mapping information is applied at boot time.

15. The apparatus of claim 11, wherein the mapping information is applied every time a thermal policy is needed.

16. The apparatus of claim 11, wherein the thermal cooler configuration comprises at least one thermal actions comprising setting a frequency limit, and setting a CPU core limit.

17. The apparatus of claim 11, wherein the thermal policy controls a power budget based a target temperature.

18. A method, comprising:
storing mapping information of process-dependent power data to a corresponding thermal policy in a memory by a semiconductor chip;
obtaining process-dependent power data of the chip based on process corner information of the chip; and
applying a thermal policy based on the stored mapping information and the obtained process corner information, wherein the mapping information is a mapping table contains thermal policies corresponding with pairs of a process corner and a leakage.

19. An apparatus, comprising:
a memory that stores mapping information of process-dependent power data to a corresponding thermal policy;
a process corner handler that obtains process-dependent power data of the chip based on process corner information of the chip; and
a thermal manager that applies a thermal policy based on the stored mapping information and the obtained process corner information, wherein the mapping information is a mapping table contains thermal policies corresponding with pairs of a process corner and a leakage.

* * * * *